Figure 1:
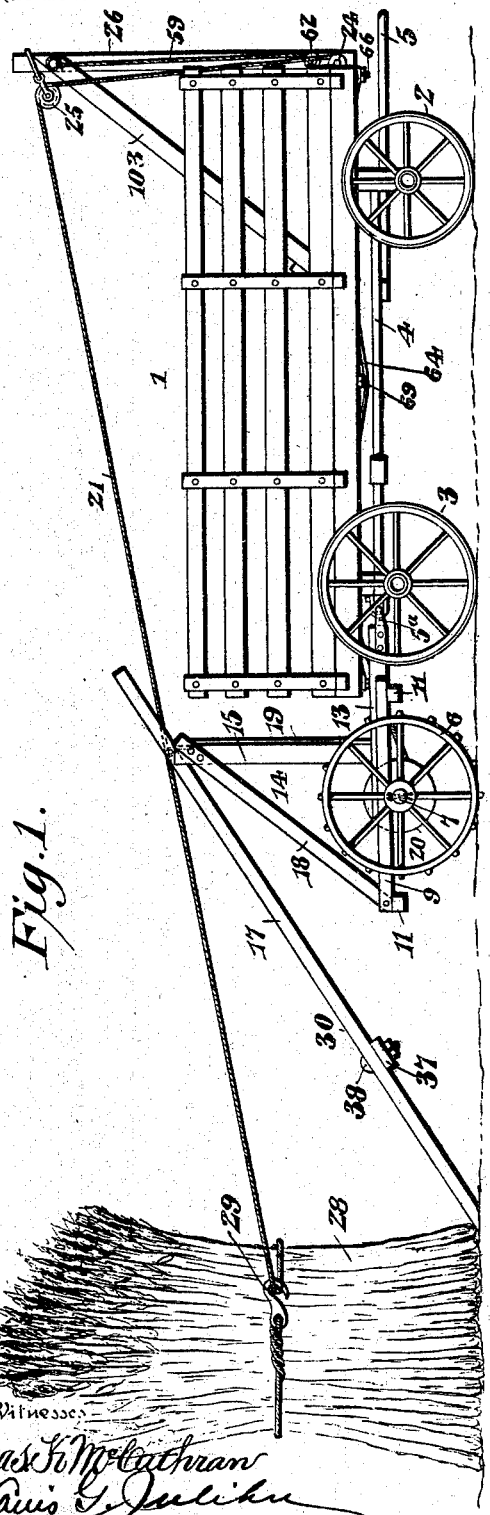

No. 680,979. Patented Aug. 20, 1901.
O. B. JACOBS.
CORNSTALK LOADER.
(Application filed Apr. 24, 1900.)
(No Model.) 4 Sheets—Sheet 1.

Witnesses:
Jas. K. McCuthran
Lauis G. Julihn

Olaus B. Jacobs,
Inventor
By
E. G. Siggers
Attorney

No. 680,979. Patented Aug. 20, 1901.
O. B. JACOBS.
CORNSTALK LOADER.
(Application filed Apr. 24, 1900.)
(No Model.) 4 Sheets—Sheet 2.
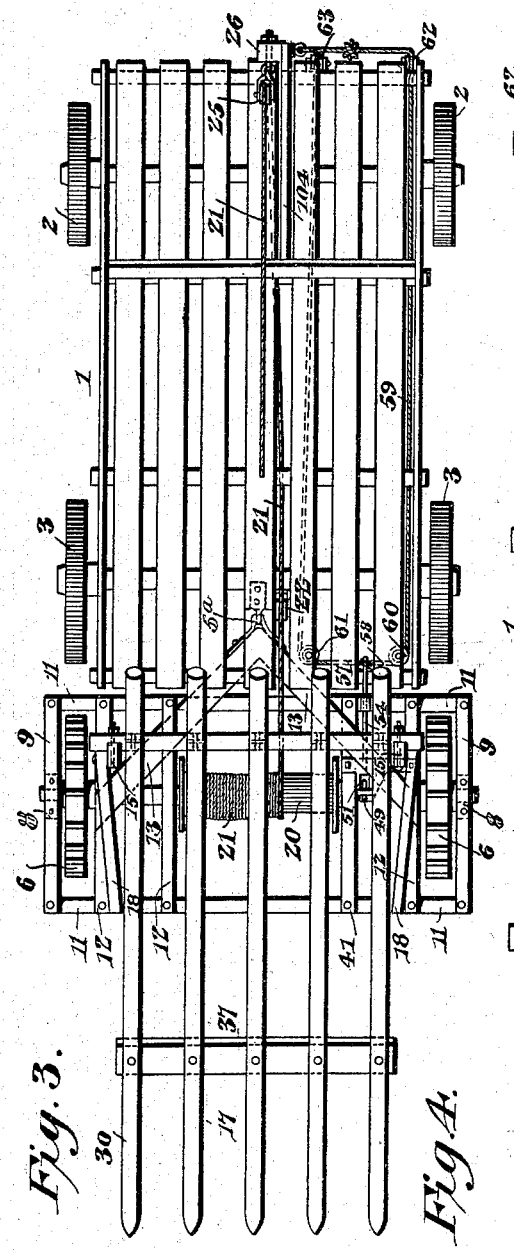
Fig. 3.
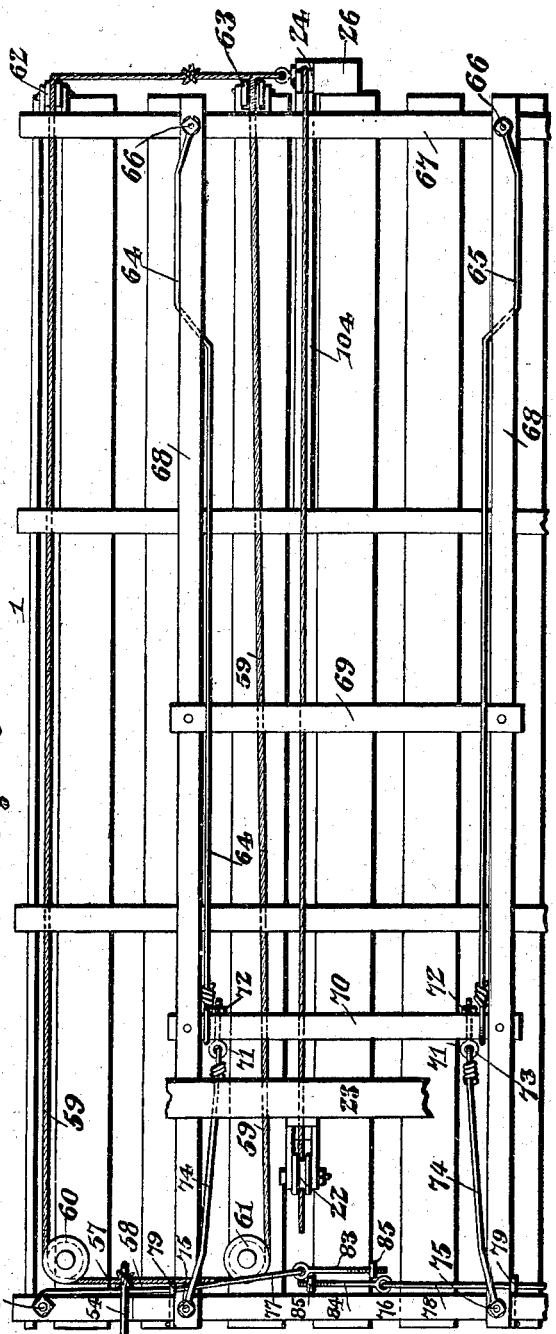
Fig. 4.
Olaus B. Jacobs, Inventor
Attorney
THE NORRIS PETERS CO., PHOTO-LITHO., WASHINGTON, D. C.

No. 680,979. Patented Aug. 20, 1901.
O. B. JACOBS.
CORNSTALK LOADER.
(Application filed Apr. 24, 1900.)
(No Model.) 4 Sheets—Sheet 3.
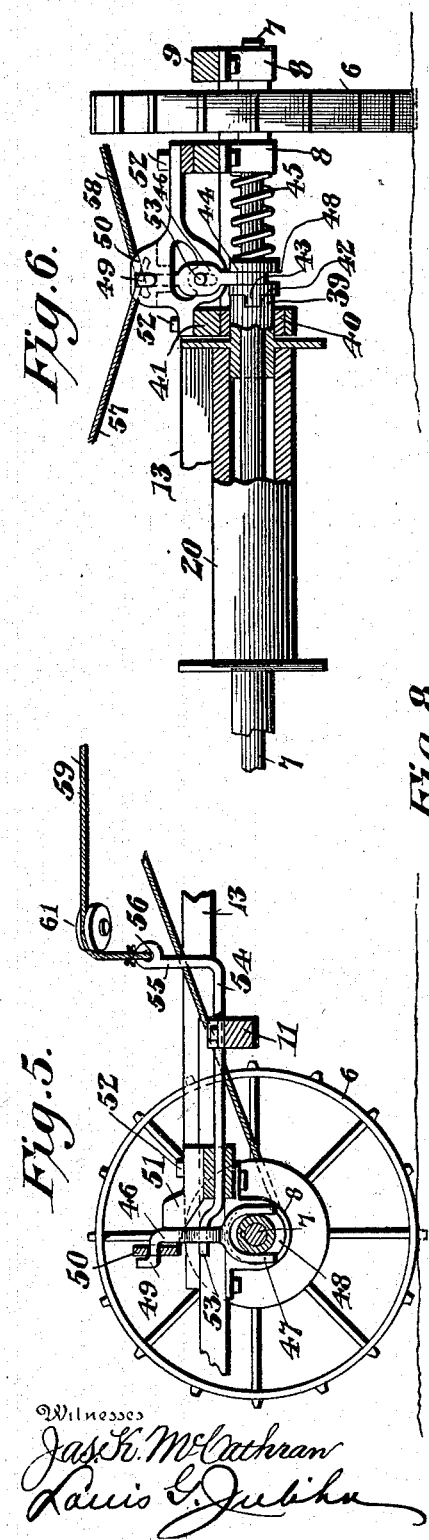
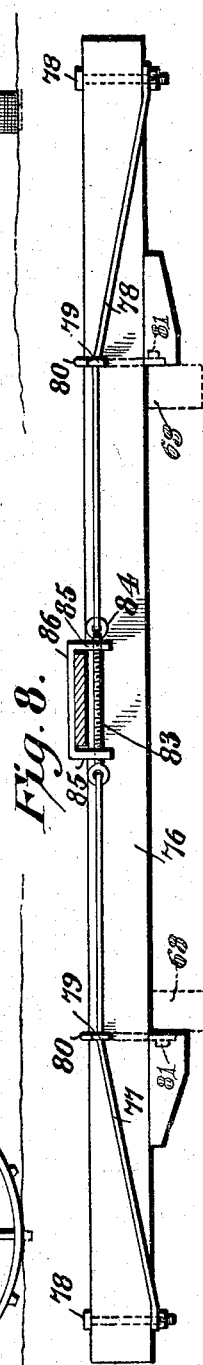
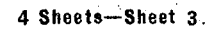
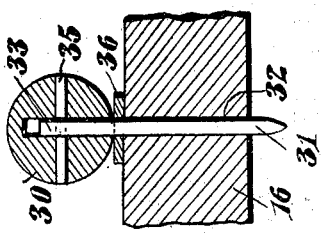
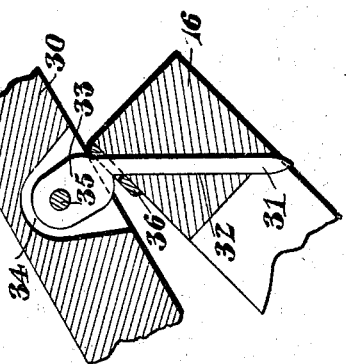
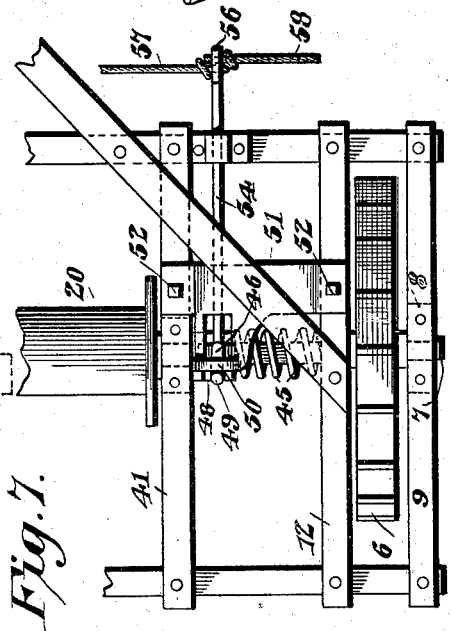
Olaus B. Jacobs, Inventor
Witnesses

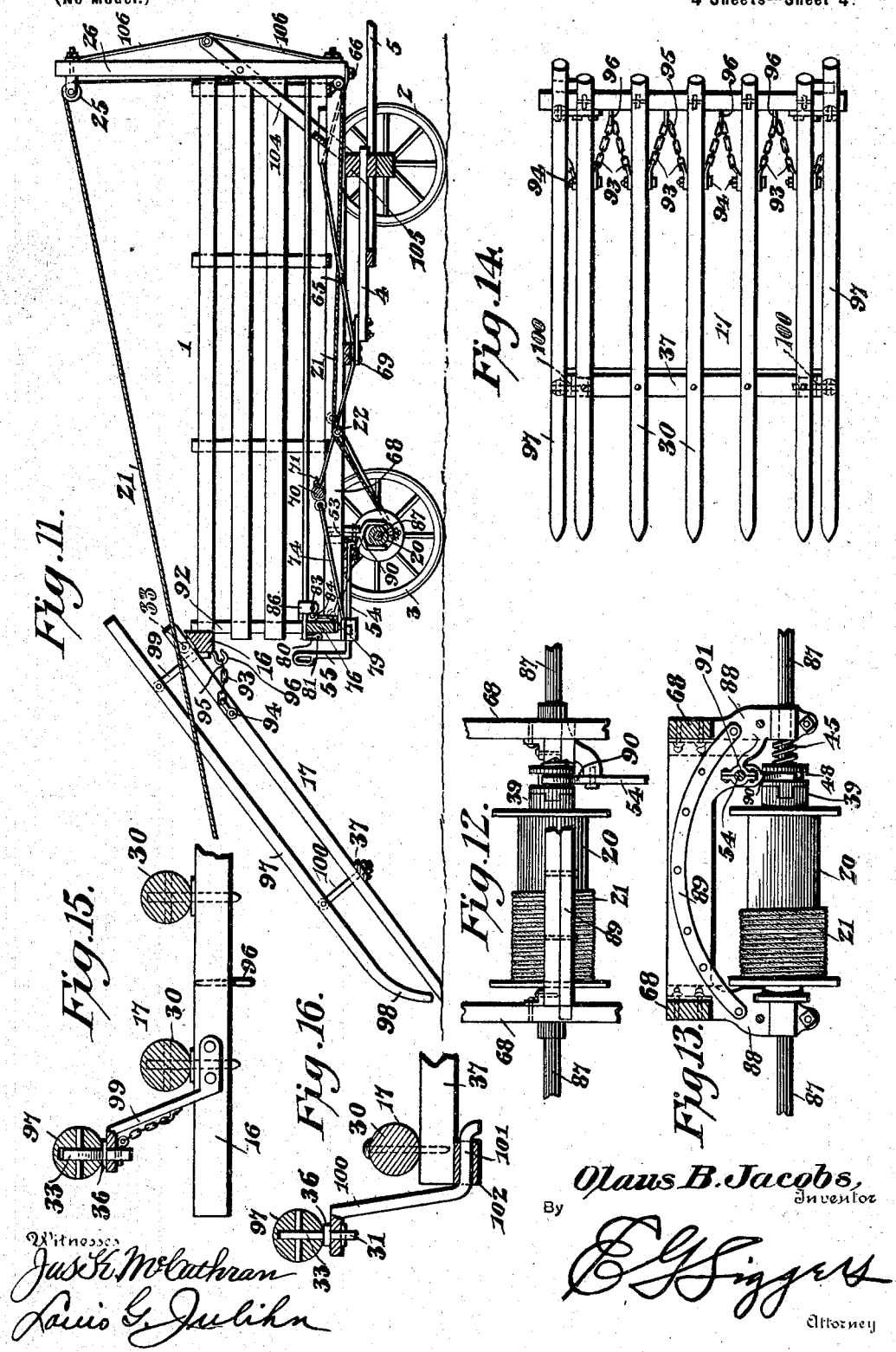

UNITED STATES PATENT OFFICE.

OLAUS B. JACOBS, OF ROLAND, IOWA.

CORNSTALK-LOADER.

SPECIFICATION forming part of Letters Patent No. 680,979, dated August 20, 1901.

Application filed April 24, 1900. Serial No. 14,182. (No model.)

*To all whom it may concern:*

Be it known that I, OLAUS B. JACOBS, a citizen of the United States, residing at Roland, in the county of Story and State of Iowa, have invented a new and useful Cornstalk-Loader, of which the following is a specification.

My present invention relates to a novel loading apparatus of that particular class ordinarily designated as "stalk-loaders."

The objects of the invention are various; but the primary ends in view are the provision of means for loading a shock of stalks from the ground to the top of a rack located in the field, in order that each shock will be dropped upon the top of the load to facilitate the piling up or loading of the shocks in orderly arrangement one upon the other within the rack; to provide means for elevating the shocks, which derives its power from the progress of the rack over the field; to provide for the detachment of the entire loading apparatus from the loaded rack and for its attachment to an empty rack; to provide means for facilitating the loading of the shocks located to one side of the rack, thus permitting the rack to be drawn between two rows of shocks and to be loaded with the shocks from both sides without necessity for turning the rack; to provide simple and effective mechanism for throwing the cable-drum into or out of operation; to strengthen and brace the bottom of the rack to prevent breakage when the shocks are thrown into the rack with some violence from above, and to construct the entire apparatus in a simple and durable manner.

Further and subordinate objects of the invention will appear more fully hereinafter.

To the accomplishment of the object stated my apparatus comprises, essentially, the portable stalk rack or wagon provided at its rear end with a stalk-incline, the rear end of which rests loosely upon the ground and the forward end of which is supported at the top of the rack at its rear end. This incline is constructed in a manner to permit its rear end to be swung laterally to present it at the base of a shock which is designed to be drawn up the inclined plane and deposited in the rack from above by means of a load-cable attached to the shock, passed over suitable pulleys at the front end of the rack, and having its opposite end wound upon a drum which, at the will of the operator, is operatively connected to or disconnected from the wheels of the rack or wheels provided particularly for the actuation of the drum, the essential feature of the arrangement stated being that construction and arrangement of the inclined plane which effects the loading of the shocks into the rack from a point located in or slightly above the plane of its top.

Further details of construction and arrangement will appear more fully hereinafter, the apparatus will be illustrated in detail in the accompanying drawings, and the novel subject-matter will be presented in the appended claims.

Figure 2:
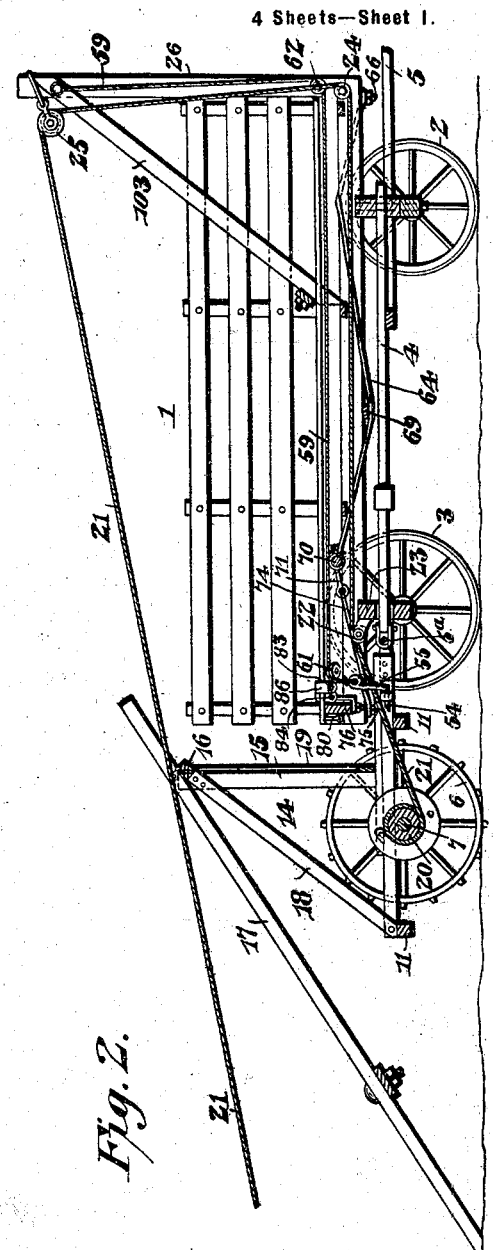

Referring to the drawings, Figure 1 is a side elevation of my loading apparatus complete, a shock of cornstalks being shown in position to be loaded into the rack. Fig. 2 is central longitudinal section of the subject-matter of Fig. 1 with the shock omitted. Fig. 3 is a top plan view of the subject-matter of Fig. 2, certain of the parts being shown by dotted lines. Fig. 4 is a bottom plan view of the rack on a somewhat-enlarged scale. Fig. 5 is a fragmentary sectional view illustrating the construction of the drum-clutch. Fig. 6 is a sectional view of the same subject-matter, taken at right angles to the section of Fig. 5 and showing certain of the parts in dotted lines. Fig. 7 is a plan view of the subject-matter of Fig. 6. Fig. 8 is a detail view of one of the transverse rack-sills, showing the manner of bracing the same and of preventing accidental raising of the rack-body from the bed-beams. Figs. 9 and 10 are detail sectional views illustrating the means for attaching the bars of the incline to the incline-supporting frame. Fig. 11 is a central longitudinal sectional view through a modified form of my apparatus in which the incline is provided with guard-rails and which includes a modified form of securing means for the bars of the incline and a modified form of mounting for the drum, which latter in this embodiment of the invention is mounted upon a shaft or axle of the rack, as distinguished from its location upon a separate loader-truck, as shown in the preceding figures. Figs. 12 and 13 are detail views of the modified form of drum and its mounting employed in connection with the construction shown in Fig. 11. Fig. 14 is a detail view of the modified form of incline and incline-securing means, and Figs. 15 and 16 are detail sectional views illustrating the manner of mounting the opposite ends of the guard-rails shown in Fig. 11.

Inasmuch as the preferred embodiment of my invention differs in some respects from the modified form thereof, which I have deemed it expedient to illustrate, I shall first proceed with a description of the preferred construction illustrated in the first ten figures of the drawings and will then describe the modified construction illustrated in the remaining figures.

Referring to the numerals of reference employed to designate corresponding parts in the several views, 1 indicates a portable rack, which, as usual, comprises a more or less open body and suitable running-gear, comprising, for instance, the front and rear wheels 2 and 3, together with their mounting and the usual reach 4 and tongue 5. To the rear portion of the running-gear—as, for instance, to the rear extremity of the reach 4—is detachably connected, as by a clevis 5ª, what I will term the "loader-truck," comprising the supporting and drum-actuating wheels 6, mounted upon a shaft 7, journaled in suitable bearings 8, supported upon the under side of the end rails 9, the front and rear transverse rails 11, and a number of cross-bars 12, secured at their opposite ends to the rails 11 and designed to stiffen the truck-frame and to constitute additional bearing-supports for the drum-shaft. The truck-frame is additionally braced by the oblique brace-bars 13, bolted at their rear ends to the cross-bars 12 and converging at their front ends, as indicated clearly in Fig. 3 of the drawings, for attachment to the running-gear of the rack by means of the clevis 5ª, as stated. Upon the truck-frame as thus constructed is rigidly carried what may be termed the "incline-supporting" frame 14, comprising a pair of standards 15, rising from the cross-bars 12 of the truck-frame adjacent to the rear end of the rack and connected at their upper ends by the horizontal supporting-bar 16, which with the standards comprises a support for the loading-incline 17, said support being further braced by rearwardly-extending brace-bars 18, connected at their rear ends to the rear rail 11 of the truck-frame and at their upper ends to the standards 15 and bar 16. The standards are further braced by diagonal cross-braces 19, secured to their front faces and extending diagonally between their opposite ends.

It will be noted that the supporting-bar 16 is located in about the plane of the top of the rack and that the front upper end of the loading-incline is therefore disposed slightly above the rear end of the rack. This relation of the incline and rack is essential, since it is the purpose of this invention to provide a loading apparatus which will deposit the shocks into the rack from above, as distinguished from those forms of similar devices which are constructed and arranged to deposit the stalks upon the floor or bottom of the wagon or rack. There are many serious objections to the latter class of devices, the principal of which is that after the floor has been covered with shocks or bundles of stalks the succeeding shocks are necessarily dragged over those already deposited in the rack, which serves to disorder and to unequally distribute the load. My loader, on the contrary, deposits the shocks or bundles into the rack from above, so that when the floor has been covered the succeeding shocks will be deposited directly upon the tops of those already loaded and will be drawn to place without disarranging the load.

20 indicates a drum mounted upon the shaft 7 and connected therewith through the medium of a clutch, to be hereinafter described. Upon the drum is wound one end of a load-cable 21, which passes thence over a guide-pulley 22, mounted upon the rear bolster 23 of the running-gear, thence under the body of the rack to its front end, where the cable makes an upward turn around a guide-pulley 24, and extends thence through a detachable tackle-block 25, secured to the upper extremity of a comparatively high standard 26, and thence passes rearwardly above the rack to the shock 28, (indicated in Fig. 1,) in proximity to the lower end of the incline 17 and about to be drawn up to the incline and deposited in the rack by means of the load-cable 21. Any suitable means for securing the cable to the shock may be provided; but I prefer to secure a hook 29 upon the end of the cable, so that the latter may be looped around the shock and passed through the hook in a manner to cause the pull upon the cable to first tighten the loop around the shock and then draw the latter up the incline to the rack.

It will now appear that when the load-cable is attached to the shock and the drum is connected to its shaft the movement of the rack over the field as it is drawn by the draft-animals will effect the rotation of the wheels 6 and will cause the cable to be wound upon the drum and the shock to be drawn up the incline 17 and deposited into the rack from above. It is necessary to provide a mounting for the loading-incline 17, which will permit the latter to rest yieldingly upon the surface of the ground in order that it may accommodate itself to undulations, and it is desirable that provision be made for swinging the incline laterally in order that as the rack is propelled between the rows of stalks the incline may be swung from side to side to receive the shocks without necessity for backing up the rack to each individual shock. For this reason I preferably construct the incline of a number of parallel bars 30, each of which is independently pivotally connected to the supporting-bar 16 by means of a swiveled pin 31, passed vertically through an aperture 32 in the bar 16 and having a flattened head 33 in angular relation to the pin and located within a recess 34 in the under side of the bar 30 and pivotally connected to said bar by a horizontal pintle 35. A washer 36 is preferably interposed between the contacting faces of the bars 30 and 16 and surrounding each of the pins 31. By this mounting the bars of the incline are permitted to swing horizontally, with the pins 31 as axes, for presentation to stalks located out of line with the rack or vertically upon the pintles 35 as axes to accommodate the incline to the undulations of the ground.

In order to retain the several bars 17 in parallel relation without interfering with the pivotal movements described, they are connected adjacent to their lower ends by a cross-bar 37 by means of swiveled bolts 38, fitted through openings in the bar 17 of sufficient size to permit the latter to rotate freely upon the bolt. The bars 16 and 37 serve to retain the bars 17 in spaced relation and permit them to swing freely both horizontally and vertically for the purposes stated. It has been remarked that the drum 20 is designed to be connected to the shaft 7 by means of a clutch. While many forms of clutch may be devised for this purpose, it is essential in apparatus of this character to provide a clutch which will not be materially affected by the violent vibration of the truck-frame as it is drawn over rough ground. In Figs. 5, 6, and 7 I have illustrated a clutch device with special reference to this consideration. Into one end of the drum 20, which is hollow, I fit and secure a sleeve or collar 39, which is mounted loosely on the shaft 7 and constitutes the lowest member or sleeve of the clutch. This sleeve 39 is revoluble in a bearing 40, carried upon the under side of the drum, supporting bar 41, of which latter there are two, one being located at either end of the drum 20 and in parallel relation with the cross-bars 12 of the truck-frame, and like said bars supported at their opposite ends upon the rails 11. The outer face of the clutch member or sleeve 39 is provided with recesses or notches 42, into which fit corresponding projections 43 upon the movable clutch-collar 44, backed by a spring 45, encircling the shaft 7 and bearing at its opposite ends against the collar 44 and one of the bearings 8.

46 indicates an oscillatory shifter or clutch-arm having its lower bifurcated end 47 straddling the collar 44 and located within an annular recess 48 formed therein. The upper end of the shifter 46 is bent into angular relation with the main portion thereof to form a crank 49, passing through the upstanding flange 50 of a bearing-bracket 51, bolted at its opposite ends, as by bolts 52, to the bars 41 and 12, located beyond one end of the drum. At a point intermediate of its length the shifter 46 is pivotally connected to a crank 53, formed at one end of a clutch-actuating shaft 54, journaled in suitable bearings in the bracket 51 and upon the front rail 11 and formed at its front end with a crank-arm 55, terminating in an eyelet 56, in which are secured the opposite ends 57 and 58 of a clutch-operating cable 59, extending in opposite directions from the crank-arm and passed around horizontal pulleys 60 and 61, located under the rack, thence to the front end of the rack and around vertical pulleys 62 and 63 to the upper end of the standard 27 within convenient reach of the driver.

The spring 45 is of just sufficient power to prevent the movable clutch member from accidental disengagement from the sleeve 39, but obviously it may be of sufficient power to retain the clutch in a normally-engaged position. By pulling upon the proper clutch-cord the driver may effect the disengagement of the clutch in order to prevent the rotation of the drum while the wagon or rack is being driven into proximity to the shocks. As soon as the latter have been reached, however, a pull upon the other clutch-cord will swing the crank-arm in the reverse direction and cause the crank 53, at the other end of the crank-actuating shaft 54, to oscillate the shifter and bring the clutch-collar 44 into engagement with the drum, it being understood that the clutch-collar is splined upon the shaft, as shown in Fig. 5, and that the engagement of the clutch-collar with the sleeve 39 will therefore effect the rotation of the drum to wind the load-cable thereon as the rack is drawn over the field. The dropping of the heavy shocks into the rack from the upper end of the incline produces considerable strain on the bottom of the rack, and I therefore desire to compensate for this strain in some measure by providing one or more stout brace-wires 64 and 65, connected at their front ends to bolts 66, depending from the transverse end sill 67 at the front end of the rack and passed thence over one of the longitudinal sills 68 and under a transverse body-brace 69, bolted to the under edges of each of the sills 68 and finally connected at its extremity to a second body-brace 70, in a somewhat-higher plane than the brace 69. Through the brace 70 are passed a pair of tension-bolts 71, designed to be adjusted longitudinally by nuts 72, screwed thereon and having formed at their opposite ends the eyelets 73, to which are connected the short brace-wires 74, secured at their rear ends by the bolts 75, which serve to prevent splitting of the sills and retain the ends of the wires. These brace-wires, together with the tension-bolts 71, constitute a simple and convenient form of tension mechanism for producing the necessary tension upon the brace-wires of the rack.

It sometimes happens that it is necessary to check the progress of the rack abruptly, and if the ground is particularly rough the rear end of the incline may engage therewith and produce considerable strain, tending to elevate the rear end of the rack. This is particularly true where the upper end of the incline is connected directly to the rack, as in the modified form of my invention to be described. I therefore provide a simple and convenient means for bracing the rear transverse sill 76 of the rack-body and for preventing it from being lifted away from the longitudinal sills 68. The outer ends of a pair of transverse brace-wires 77 and 78 are secured to the under sides of the opposite ends of the rear sills 76 by bolts 78', passing vertically through the sill, and are carried thence along one side face of the sill, where they are passed through eyelets 79, formed at the ends of securing-hooks 80, passed over the upper edge of the sill 76 and bolted at their lower ends, as by bolts 81, to the longitudinal sills 68, which latter are held by cleats nailed to the under sides of the sills 76.

The inner ends of the transverse brace-wires 77 and 78 are connected, respectively, to tension-bolts 83 and 84, which are passed through threaded apertures in the angular ends 85 of a tension-plate 86, straddling one of the bottom slats of the rack, as clearly shown in Figs. 2 and 8. From careful consideration of the latter figure it will appear that the transverse wires 77 and 78 constitute not only a tension device or strengthening means for the sill 76, but also serve to retain the hooks 80 in their proper positions to prevent the rising of the sill 76 from the sill 68 under the conditions heretofore specified.

The foregoing is a complete comprehensive description of the preferred embodiment of my invention; but in the last six figures of the drawings I have illustrated a loader constructed in a manner which under some circumstances may be quite efficient. In the preferred embodiment of my invention I employ, as stated, a separate loading-truck which, together with the cable and other operative parts of the loader proper, is designed to be disconnected from the rack when loaded and to be properly arranged upon an empty rack to be loaded in turn.

In the modified embodiment of the invention, on the contrary, I contemplate the employment of a rack permanently equipped with the loading apparatus and eliminating the separate loading-truck. Referring now to the construction shown in Figs. 11 to 16, inclusive, 87 indicates the rear axle of the rack upon which the drum 20 is directly mounted. Instead of the bearing-bracket 51 and the various frame-bars contributing to the support of the drum and its clutch in the preferred embodiment of my invention the axle 87 is carried by drop-bearings 88, bolted or otherwise secured to and depending from the longitudinal sills 68 of the rack and rigidly connected and braced by an arcuate brace-plate 89. (Clearly shown in Fig. 13 of the drawings.) The shifter 90 in this embodiment is similar to the shifter 46, (shown in Fig. 5 of the drawings,) except that it is not provided with a crank 49, engaging a bearing, but has a direct pivotal connection with the crank 53 of the shifter-actuating shaft 54, which latter is provided with a bearing, as indicated at 91, in one of the drop-brackets 88 and is extended rearwardly to locate its crank-arm 55 directly behind the rack and in position to be operated by the helper, who is stationed on the ground at the rear end of the rack and whose business it is to properly position the incline, attach the cable to the shocks, and operate the shifter-actuating or clutch shaft for the purpose of throwing the drum into or out of engagement with its operating mechanism. When the drum is mounted directly on the rack, the reach 4 is extended from the front bolster only to about the center of the vehicle, as shown in Fig. 11, where it is connected to the brace-bars 69. It is in connection with this construction that the longitudinal rack-bracing wires are particularly desirable, inasmuch as they compensate for any slight weakening of the structure consequent upon the shortening of the reach. I also contemplate the elimination in some instances of the pins 31 connecting the bars of the incline with the incline-supporting bar 16, and as the loading-truck and its frame are also eliminated the incline-supporting bar 16 is supported directly between the upper ends of the rear standards 92 of the rack, which, as before stated, will bring the weight of the incline and its load directly upon the rear transverse sill 76, which, however, is strengthened proportionately, as described.

As shown in Fig. 11, the incline 17 rests directly upon the incline-supporting bar 16, carried at the opposite ends of the standards 92, and is retained in place by a series of short chains 93, connected at their opposite ends to bolts 94, passed through each of the bars of the incline. A somewhat-enlarged loop 95, located at the middle of each of these chains, is passed into a hook 96, extending from the bar 16 midway between each pair of bars. Whether or not the truck is employed I also prefer to provide a pair of guard-rails 97, located at each side of the incline and in a somewhat-higher plane, their lower ends being curved into proximity to the lower end of the inclines, as indicated at 98, to prevent the stalks from catching as the shock is drawn upon the incline through the rotation of the drum. Obviously, these guard-rails must be permitted to swing vertically and horizontally with the incline, and I therefore swivel the upper end of each at the upper end of the guard-rail bracket 99, upwardly and outwardly inclined from the bar 16, to which the bracket is bolted. At a point adjacent to the transverse connecting-bar 37 of the incline each of the guard-rails is supported pivotally at the upper end of a swinging guard-rail bracket 100, having a right-angular end 101, journaled in a bearing-sleeve 102, mounted upon the under side of the bar 37. Any suitable means for properly bracing the standard 26 may be provided—for instance, an inclined brace 103, connected at one end to the standard adjacent to its top and having its lower end braced against any suitable part of the rack structure; but where the rack is intended to be employed in connection with slings or like elevating devices for unloading the rack the latter may be equipped with an inclined brace 104 similar to the brace 103, but bearing at its lower end against the front bolster 105 and having its outer extremity extended beyond the standard 27 and secured at the contiguous ends of a pair of brace-rods 106, the opposite ends of which are bolted at the top and bottom of the standard.

Obviously the loading apparatus may be employed with equal facility in connection with various styles of vehicles or other receptacles to be loaded, and I therefore desire to have it distinctly understood that the term "rack" as employed in the claims is intended to comprehend any receptacle of whatever character with which the loading mechanism may be used, and by the term "traveling support" I mean either the rack or truck or both of them when connected.

From the foregoing it will appear that I have invented a simple, ingenious, and effective stalk-loader, by means of which the shocks may be readily elevated above the rack and deposited therein by the application of motive power obtained solely by the propulsion of the vehicle over the field; but while the present embodiment of my invention appears at this time to be preferable, I do not wish to limit myself to the structural details defined, but reserve the right to effect such changes, modifications, and variations as may come properly within the scope of the protection prayed.

What I claim is—

1. A loader comprising a traveling support and an incline having its delivery end located at or adjacent to the top thereof, and its opposite end resting upon the ground, said incline being loosely mounted to have free lateral movement both horizontally and vertically to facilitate its movement over the ground and to permit it to swing toward the opposite sides of the rack for presentation to the shocks, said mounting of the incline comprising a double pivotal connection, the pivots of which are separate.

2. In a loader, the combination with a support, of a loading-incline composed of a series of bars each having a double pivotal connection with the support in a manner to permit of their vertical and horizontal movement, the pivots of said connection being separate and means for maintaining the parallel relation of said bars.

3. A loader comprising a loading-truck having means of attachment to a rack, an incline-supporting frame upstanding from the truck, and a loosely-mounted incline having its upper end supported at the top of the upstanding frame and its lower end resting upon the ground, the loose mounting of the incline serving to permit its free lateral movement both horizontally and vertically.

4. In a loader, the combination with a loading-truck, of an incline-supporting frame carried by the truck and extending thereabove, an incline supported by the frame and having its opposite end arranged to rest upon the ground, and hauling mechanism carried by the truck and designed to elevate a shock or the like upon the incline.

5. In a loader, the combination with a loading-truck comprising a truck-frame, a pair of wheels, and an incline-supporting frame carried by the truck, of a vertically and horizontally movable incline carried by the incline-supporting frame, a drum operatively connected with the wheels of the truck, and a cable wound upon the drum and designed for attachment to a shock or the like for the purpose of elevating the latter upon the incline.

6. In a loader, the combination with a truck comprising a frame and wheels, of an incline-supporting frame carried by the truck, an incline loosely connected at its upper end to the incline-supporting frame, and having its lower end resting upon the ground, a drum, a hauling-cable wound upon the drum, and clutch mechanism for operatively connecting the drum with the wheels.

7. In a loader, the combination with an incline-supporting frame and an incline carried by the frame and having its lower end resting upon the ground, a drum, a hauling-cable wound upon the drum, clutch mechanism arranged to throw the drum into or out of operation, and a shifter arranged to operate the clutch mechanism and having a bearing in a fixed part.

8. In a loader, the combination with an inclined support and an incline connected to the support at one end and having its lower end arranged to rest upon the ground, of a shaft, a drum mounted upon the shaft and having a clutch member, a movable clutch member slidable upon the shaft, a shifter engaging the movable clutch member and provided with a supporting-crank having a bearing in a fixed part, and means for oscillating the shifter.

9. In a loader, the combination with a support and a loading-incline carried thereby, of a shaft, a drum mounted loosely upon the shaft and having a clutch member, a movable clutch member slidable upon the shaft, a fixed bearing-bracket, a shifter engaging the movable clutch member and having a supporting-crank engaging the bearing-bracket, and a shifter-actuating shaft provided with a crank at one end engaging the shifter.

10. In a loader, the combination with a traveling support, of a loading-incline having its discharge end located in proximity to the top of the rack at its rear end, a standard extending above the rack at its front end, a drum located below the rack adjacent to its rear end, suitable pulleys located upon the rack and standard, and a hauling-cable wound upon the drum and passed around said pulleys.

11. In a loader, the combination with a rack, and pulleys, of a loading-truck detachably connected to said rack, a loading-incline supported by the truck and having its discharge end adjacent to the top of the rack, hauling mechanism carried by the truck, and a cable operated by the hauling mechanism and passed around the pulleys upon the rack.

12. The combination with a support, of a loading-incline having a double pivotal connection therewith the pivots of said connection being separate.

13. The combination with a support, of a loading-incline comprising a series of connected bars each having a double pivotal connection with the support the pivots of said connection being separate.

14. In a loading-incline, the combination with a support, of a series of bars each having a double pivotal connection with the support, and a cross-bar connected to the several bars of the incline to compel their movement in unison.

15. The combination with a support, of a loading-incline, a guard-rail bracket carried by the support, a swinging guard-rail bracket carried by the incline, and a guard-rail pivotally connected to each of said brackets.

16. The combination with a support, of a relatively movable loading-incline, and guard-rails carried by the support and incline jointly.

17. The combination with a support, of a loading-incline capable of relative movement, guard-rails carried jointly by the support and incline, and means for maintaining the guard-rails in parallel relation with the incline.

18. The combination with a support, of a loading-incline, means for permitting horizontal and vertical movement of the incline with respect to its support, guard-rails located in a higher plane than the incline and carried jointly by the incline and support, and means for maintaining the parallel relation between the guard-rails and incline during the various movements of the latter.

19. The combination with a support, and a loading-incline having a double pivotal connection therewith, of guard-rails likewise having a double pivotal connection with the support, and means intermediate of the incline and guard-rails for maintaining them in parallelism during the movements of the incline.

20. The combination with a support, of a loading-incline comprising a series of bars, each having a double pivotal connection with the support, guard-rails likewise having a double pivotal connection with the support, and means for maintaining the several bars and guard-rails in parallelism.

21. The combination with a support, of a loading-incline movable with respect thereto, a guard-rail disposed in a plane above the incline and having pivotal connection with the support, and a swinging guard-rail bracket carried by the incline and having pivotal connection with the guard-rail.

In testimony that I claim the foregoing as my own I have hereto affixed my signature in the presence of two witnesses.

OLAUS B. JACOBS.

Witnesses:
C. E. ARMSTRONG,
H. E. MYRAH.